United States Patent [19]
Katahira

[11] Patent Number: 6,021,260
[45] Date of Patent: Feb. 1, 2000

[54] IMAGE DATA TRANSFER SYSTEM

[75] Inventor: Shunsuke Katahira, Tokyo, Japan

[73] Assignee: Kabushiki Kaisha Toshiba, Kawasaki, Japan

[21] Appl. No.: 09/007,040

[22] Filed: Jan. 14, 1998

[30] Foreign Application Priority Data

Jan. 14, 1997 [JP] Japan .................................. 9-004668

[51] Int. Cl.[7] ................................................ G06H 15/00
[52] U.S. Cl. .......................................... 395/115; 395/114
[58] Field of Search .................................. 395/101, 106, 395/112, 114–116, 821, 823, 824, 829, 834, 846, 853, 876; 358/426, 261.1, 261.4, 444, 445; 345/511, 518, 203, 202

[56] References Cited

U.S. PATENT DOCUMENTS

| 5,687,296 | 11/1997 | Shimada | 395/112 |
|---|---|---|---|
| 5,727,136 | 3/1998 | Kubota | 395/114 |

FOREIGN PATENT DOCUMENTS

| 5-108477 | 4/1993 | Japan . |
|---|---|---|
| 2 271 449 | 4/1994 | United Kingdom . |
| 0 768 578 | 4/1997 | United Kingdom . |

OTHER PUBLICATIONS

Yasunobu; "Bus Conversion Circuit"; Patent Abstracts of Japan; Publication No. 04 246947; Publication Date: Sep. 2, 1992; Vol 017, No. 019 (E–1306); (Jan. 13, 1993).

*Primary Examiner*—Arthur G. Evans
*Attorney, Agent, or Firm*—Foley & Lardner

[57] ABSTRACT

In the present invention, predetermined lower bits of address data outputted to a page memory form a base section through a system address bus, a bus conversion section, and a general purpose address bus. In addition, other address data than the predetermined lower bits is supplied the page memory through the system address bus and the bus conversion section. Address data outputted from the base section to the general purpose bus device is supplied thereto through the system address bus, the bus conversion section, and the general purpose address bus.

15 Claims, 6 Drawing Sheets

IMAGE DATA TRANSFER SYSTEM

BACKGROUND OF THE INVENTION

The present invention relates to an image transfer unit used for connecting a copy machine or the like with a facsimile apparatus, an SCSI board and a memory unit, through a bus, and an image forming apparatus using the image transfer unit.

Conventionally, an image forming apparatus such as a copying machine is capable of expanding functions by connecting options such as a printer, a facsimile apparatus, an SCSI board, a memory unit. In this case, if a general purpose bus such as an ISA bus is used, standard parts can advantageously be used with ease. An option such as a printer or a facsimile apparatus generally uses only a small memory space, and therefore, can be directly connected through a general purpose bus such as an ISA bus.

However, an image memory such as a page memory requires a memory size equivalent to at least one page of image, which is larger than the memory space for a general purpose bus such as an ISA bus. In this case, it is impossible to directly connect the image memory and a general purpose bus such as an ISA bus having a small memory space to a system bus of the image forming apparatus. To connect the image memory and the general purpose bus such as an ISA bus to the system bus, components such as an address decoder are required.

BRIEF SUMMARY OF THE INVENTION

The present invention has an object of providing an image transfer system and an image forming apparatus which are capable of connecting the general purpose bus having a small memory space and the page memory having a large memory space to the system bus without greatly increasing the number of components and are therefore capable of using a general purpose component to be used with the general purpose bus, resulting in that the price can be reduced.

In order to achieve the above object, according to one aspect of the present invention, there is provided an image transfer system comprising: a first device for generating address data; a second device having a first memory space for performing processing in accordance with address data from the first device; a third device having a second memory space larger than the first memory space for performing processing in accordance with address data from the first device; a first address bus of a plurality of bits for transferring address data outputted from the first device; a second address bus for transferring address data with use of bits less than the plurality of bits of the first address bus; and a bus conversion section for connecting a most significant bit of the first address bus with a most significant bit of the second address bus, for connecting predetermined lower bits of the first address bus with other bits of the second address bus than the most significant bit thereof, and for connecting bits of the first address bus which are not connected with the second address bus, with the third device.

The predetermined lower bits of address data outputted from the first device to the third device are supplied to the third device through the first address bus, the bus conversion section, and the second address bus, other bits of the address data other than the predetermined lower bits are supplied to the third device through the first address bus and the bus conversion section, and address data outputted from the first device to the second device is supplied to the second device through the first address bus, the bus conversion section, and the second address bus.

A memory space corresponding to predetermined lower bits of the first address bus is ½ of a memory space used by the second device.

The second device is a general purpose device such as a facsimile, hard disc HD, a floppy disc FD, and the third device is a page memory for storing image data.

The second address bus is an ISA bus which is commercially available for general purpose use.

Further, the present invention includes an image forming means for forming an image with use of the first device, the second device, and the third device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

In the following, embodiments of the present invention will be explained with reference to the drawings.

The present invention will be explained as an embodiment of an image forming apparatus of a hybrid type which has three functions as a copying machine (PPC), a facsimile (FAX), and a printer (PRT).

Figure 1:
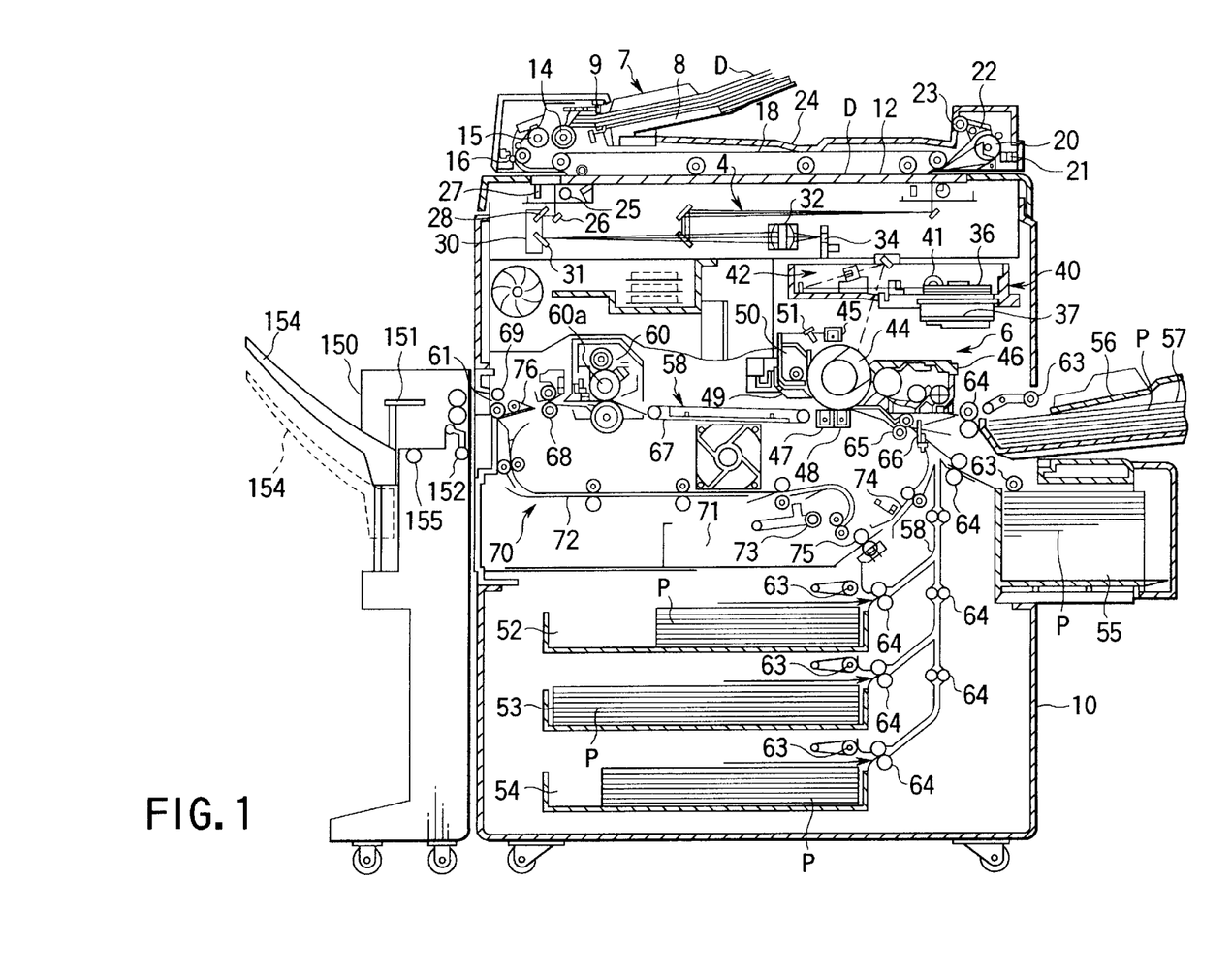
FIG. 1 is a view schematically showing the internal structure of a digital copying machine for explaining an embodiment of the present invention.

FIG. 1 is a cross-sectional view showing the internal structure of a digital copying machine as an example of an image forming apparatus according to the present invention.

As shown in FIG. 1, the digital copying machine comprises a machine body 10. Inside the machine body 10, there are provided a scanner section 4 which functions as a reading means as will be described later and a printer section 6 which functions as an image forming means.

An original-document mount stage 12 made of transparent glass where an original document D is mounted is provided on the upper surface of the machine body 10. Also, an automatic original-document feeder 7 (which will be referred to as only an ADF hereinafter) for automatically feeding original documents onto the original-document mount stage 12 is provided on the upper surface of the machine body 10. The ADF 7 can be opened and closed with respect to the original-document mount stage 12, and also functions as an original document presser for bringing an original document D mounted on the original-document mount stage 12 into a tight contact with the original-document mount stage 12.

The ADF 7 comprises an original-document tray 8 where original documents D are set, an empty sensor 9 for detecting presence or absence of an original document, a pick-up roller 14 for picking up original documents one after another from the original-document tray 8, a sheet feed roller 15 for conveying an original document picked up, paired aligning rollers 16, a conveyer belt 18 provided so as to cover substantially the entire of the original-document mount stage 12. Further, a plurality of original documents set on the original-document tray, facing upwards, are sequentially picked up in a order from the lowermost page, i.e., the last page, and are aligned by paired aligning rollers 16. Thereafter, original documents are conveyed to a predetermined position on the original-document mount stage 12 by the conveyer belt 18.

In the ADF 7, a reverse-roller 20, a non-reverse sensor 21, a flapper 22, and a feed-out roller 23 are provided at an end portion opposite to the paired aligning rollers 16 with respect to the conveyer belt 18 inserted therebetween. An original document D from which image information is read out by a scanner section 4 described later is fed out from the original-document mount stage 12 by the conveyer belt 18, and is fed out onto an original document feed-out section 24 on the upper surface of the ADF 7, through the reverse roller 20, the flapper 21, and the feed-out roller 22. In case of reading the back surface of the original document D, the flapper 22 is switched so that an original document D conveyed by the conveyer belt 18 is reversed and is thereafter fed to a predetermined position on the original-document mount stage 12, by the conveyer belt 18.

The scanner section 4 provided in the machine body 10 includes an exposure lamp 25 as a light source for illuminating the original document D set on the original-document mount stage 12, and a first mirror 26 for deflecting light reflected from the original document D. The exposure lamp 25 and the first mirror 26 are installed on a first carriage 27 provided below the original-document mount stage 12.

The first carriage 27 is provided to be movable in parallel with the original-document mount stage, and is moved reciprocally below the original-document mount stage 12, through a toothed belt not shown or the like, by a drive motor.

In addition, a second carriage 28 movable in parallel with the original-document mount stage 12 is provided below the original-document mount stage 12. The second carriage 28 is equipped with second and third mirrors 30 and 31 for sequentially deflecting the reflection light from the original document D, once deflected by the first mirror 26, such that the mirrors 30 and 31 are arranged to be perpendicular to each other. The second carriage 28 is moved in association with the first carriage 27, by a toothed belt or the like for driving the first carriage 27.

In addition, an imaging lens 32 for converging reflection light reflected from the third mirror 31 on the second carriage 28, and a CCD sensor 34 for receiving and for photo-electrically converting the light converged by the imaging lens 32 are provided below the original-document mount stage 12. The imaging lens 32 is movably provided in a plane including the optical axis of the light deflected by the third mirror 31, such that the imaging lens 32 itself moves thereby to form an image of a desired magnification rate by the reflection light. The CCD sensor 34 photo-electrically converts the reflection light thus entering, and outputs an electric signal corresponding to image data read from an original document D.

Meanwhile, the printer section 6 comprises a laser exposure device 40 which functions as a latent image forming means. The laser exposure device 40 comprises a semiconductor laser 41 as a light source, a polygon mirror 36 as a scanning member for sequentially deflecting a laser beam emitted from the semiconductor laser 41, a polygon motor 37 as a scanning motor for driving the polygon mirror 36 to rotate at a predetermined rotation speed described later, and an optical system 42 for deflecting and introducing the laser beam from the polygon mirror to a photosensitive drum 44 described later. The laser exposure device 40 having a structure as described above is fixed and supported on a support frame not shown of the machine body 10.

The semiconductor layer 41 is controlled to be turned on and off in accordance with image data read out from an original document D by the scanner section 4, or in accordance with facsimile-transfer document data or the like. A laser beam from the semiconductor layer 41 is directed to the photosensitive drum 44 through the polygon mirror 36 and the optical system 42, so as to scan the circumferential surface of the photosensitive drum 44, thereby forming an electrostatic latent image thereon.

The printer section 6 thus has a rotatable photosensitive drum 44 as an image carrier provided in the substantial center of the machine body 10. The circumferential surface of the photosensitive drum 44 is exposed to a laser beam from the laser exposure device 40, to form a desired electrostatic latent image. Around the photosensitive drum 44, an electrostatic charger 45, a developing device 46, a transfer charger 48 integrally including a separation charger 47, a separation hook 49, a cleaning device 50, and a discharging device 51 are provided and arranged in this order. The electrostatic charger 45 serves to electrically charge the circumferential surface of the drum with predetermined charges. The developing device 46 serves to supply an electrostatic latent image formed on the circumferential surface of the photosensitive drum 44, with toner as a developer, to develop the electrostatic latent image at a desired image density. The transfer charger 48 serves to transfer a toner image formed on the photosensitive drum 44 onto a transfer medium supplied from a sheet cassette described later, i.e., a copy paper sheet P. The separation charger 47 serves to separate a copy paper sheet P from the photosensitive drum 44. The separation hook 49 is used to separate a copy paper sheet P from the circumferential surface of the photosensitive drum 44. The cleaning device 50 serves to clean toner remaining on the circumferential surface of the photosensitive drum 44. The discharging device 51 serves to remove electric charges from the circumferential surface of the photosensitive drum 44.

Below the machine body 10, an upper cassette 52, a middle cassette 53, and a lower cassette 54 are provided and layered, and are respectively filled with copy paper sheets of different sizes. In the side of the cassettes, a large capacity feeder 55 is provided and contains copy sheets of a size which are used most frequently, e.g., about 300 copy paper sheets P of A4 size. Above the large capacity feeder 55, a sheet feed cassette is detachably attached and also serves as a manual feed tray 56.

In the machine body 10, a convey path 58 is formed so as to extend from each of the cassettes and the large capacity feeder 55, passing through a transfer section positioned between the photosensitive drum 44 and the transfer charger 48. A fixing device 60 having a fixing lamp 60a is provided at the terminating end of the convey path 58. A feed-out port 61 is formed in the side wall of the machine body 10 opposed to the fixing device 60, and a finisher 150 adopting a single tray is attached to the feed-out port 61.

In the vicinity of each of the upper cassette 52, the middle cassette 53, the lower cassette 54, the sheet feed cassette 57, and the vicinity of the large capacity feeder 55, a pick-up roller 63 is provided for picking up paper sheets P, one after another, from the cassette or feeder. In addition, the convey path 58 is provided with a number of pairs of sheet feed rollers 64 for conveying copy sheets P picked up by pick-up rollers, through the convey path.

In the upstream side of the photosensitive drum 44 on the convey path 58, paired resist rollers 65 are provided. The paired resist rollers 65 correct an inclination of a copy paper sheet P picked up and align the top end of a toner image on the photosensitive drum 44 with the top end of the copy paper sheet P, and feeds the copy paper sheet P to the transfer section at the same speed as the moving speed of the circumferential surface of the photosensitive drum 44. Before the paired resist rollers, i.e., in the side facing the sheet feed roller 64, an pre-aligning sensor 66 is provided for detecting an arrival of a copy paper sheet P.

Copy paper sheets P picked up by the pick-up roller 63, one after another from any of the cassettes or the large capacity feeder 55, are fed to the paired resist rollers 65 by the paired sheet feed rollers 64. Further, the top end of every copy paper sheet P is aligned by the paired resist rollers 65, and thereafter, the copy paper sheets P are fed to the transfer section.

In the transfer section, a developer image formed on the photosensitive drum 44, i.e., a toner image is transferred onto a paper sheet P by the transfer charger 48. A copy paper sheet P on which a toner image has been transferred is separated from the circumferential surface of the photosensitive drum 44 by operations of the separation charger 47 and the separation hook 49, and is conveyed to the fixing device 60 by the conveyer belt 67 forming part of the convey path 52. Further, a developer image is melted and fixed onto the copy paper sheet P, and thereafter, the copy paper sheet P is fed out onto a finisher 150 through a feed-out port 61 by paired sheet feed rollers 68 and paired feed-out rollers 69.

Below the convey path 58, an automatic double-side device 70 is provided to reverse a copy paper sheet P once passed through the fixing device 60 and to feed the copy paper sheet P again to the paired resist rollers 65. The automatic double-side device 70 comprises a temporary stock section 71, a reverse path 72, a pick-up roller 73, and a sheet feed roller 75. The temporary stock section 71 serves to temporarily stock a copy paper sheet P. The reverse path 72 is branched from the convey path 58 and serves to reverse and introduce a copy paper sheet P once passed through the fixing device 60, to the temporary stock section 71. The pick-up roller 73 picks up copy paper sheets P thus stocked in the temporary stock section, one after another. The sheet feed roller 75 serves to feed copy paper sheets thus picked up, to the paired resist rollers 65. At the branch portion where the reverse path 72 is branched from the convey path 58, a distribution gate 76 is provided to selectively distribute copy paper sheets P to the feed-out port 61 or the reverse path 72.

In case of taking a double-sided copy, a copy paper sheet P once passed through the fixing device 60 is introduced to the reverse path 72 by the distribution gate 76 and is temporarily stocked in the temporary stock section 71, kept reversed. Thereafter, the copy paper sheet P is fed to the paired resist rollers 65 through the convey path 74, by the pick-up roller 73 and the paired sheet feed rollers 75. Further, the copy paper sheet P is aligned by the paired resist rollers 65, and is thereafter fed again to the transfer section, thereby to transfer a toner image onto the back surface of the copy paper sheet P. Thereafter, the copy paper sheet P is fed out onto the finisher 150 through the convey path 58, the fixing device 60, and the feed-out roller 69.

The finisher 150 serves to staple copy paper sheets P in units of sets. Every time a copy paper sheet to be stapled is fed out from the feed-out port 61, a guide bar 151 guides and aligns the copy paper sheet P to be close to the side where stapling is carried out. After all the copy paper sheets are fed out, a sheet press arm 152 presses the copy paper sheets P fed out, in units of sets, and a stapler unit (not shown) performs stapling. Thereafter, the guide bar 151 moves down, and the copy paper sheets P thus stapled are fed out, in units of sets, onto a finisher feed-out tray 154 by a finisher feed-out roller 155. The amount by which the finisher feed-out tray 154 moves down is decided to some extent, depending on the number of copy paper sheets P to be fed out, and the tray 154 moves down by steps for every unit of set. In addition, the guide bar 151 which aligns copy paper sheets P fed out is positioned at a height at which the guide bar 151 does not touch copy paper sheets P which have already been stapled and set on the finisher feedout tray 154.

The finisher feed-out tray 154 is connected to a shift mechanism (not shown) which shifts for every unit of set (for example, in four directions to the front, rear, left, and right), during a sort mode.

In addition, at an upper portion of the front side of the machine body 10, there is provided an operation panel 80 for inputting various copying conditions, a copy start signal for starting copying operation, and the like.

Figure 2:
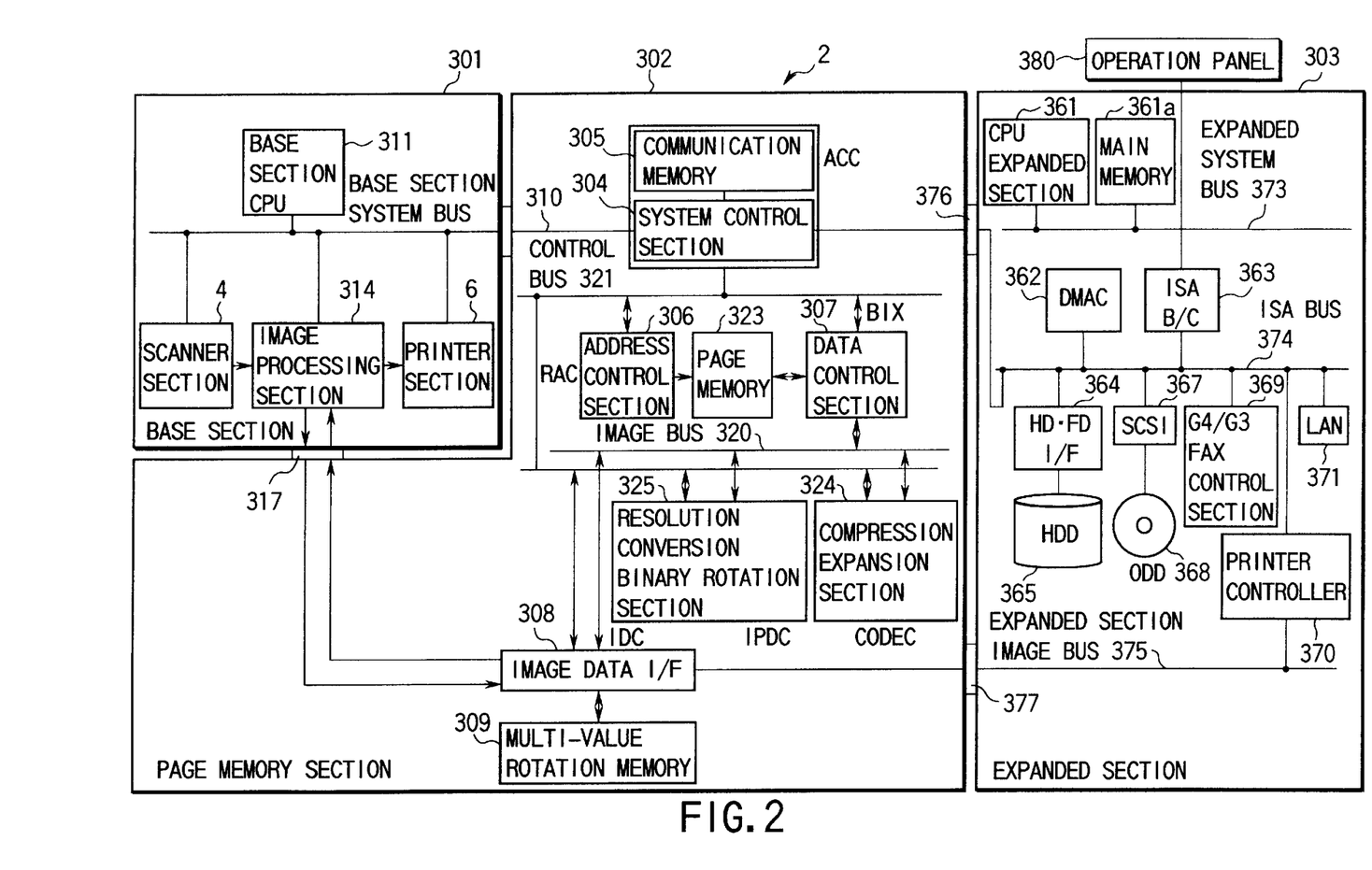
FIG. 2 is a block diagram showing a control system of a digital copying machine.

Next, a control system of a digital copying machine will be explained with reference to FIG. 2.

The entire of a control system of a digital copying machine is roughly divided into three blocks, i.e., a base section 301 forming a digital copying machine in which a scanner section 4 and a printer section 6 are connected by an image processing section 314, a page memory section 302 which realizes memory copying (or electronic sorting) by receiving and recording image data from the base section 301 and by transferring the image data again to the base section 301, and an expanded section 303 constituted by a mother board or the like which comprises a hard disc (HD) as a secondary memory for storing compressed image data of the page memory section 302, a FAX board (or G4/G3 facsimile control section) 369 for performing data transmission with an external device for compressed image data via public line, a LAN board (or local area network channel control section) 371 for performing data transmission via LAN, an expanded section CPU 361 for controlling the hard disc and boards by a system bus 373 and an ISA bus 374, a main memory 361a used by the extended section CPU 361, and a DMAC 362 for controlling DAM transfer on the ISA bus 374. The base section 301 and the page memory section 302 are connected to each other by a basic section system interface 316 for transferring control data and a base section image interface 317 for transferring image data. In addition, the page memory section 302 and the expanded section 303 are connected to each other by an expanded section system interface 376 for transferring control data and an expanded section image interface 377 for transferring image data.

Next, the internal structures of the three blocks will be schematically explained below with reference to FIG. 2.

The base section 301 consists of an input section (or scanner section) 4, an output section (or printer section) 6, an image processing section 314, and a control section (or basic section CPU) 311 for controlling the foregoing sections.

The scanner section 4 includes a CCD line sensor (not shown) consisting of a plurality (or line) of light receive elements disposed in line. The scanner section 4 reads an image on an original document set on an original mount stage (not shown), for every unit line, in accordance with an instruction from the base section CPU311, and converts the density of the image into digital data of 8-bit. The scanner section 4 thereafter outputs the 8-bit digital data in form of time-based digital data together with synchronization signals to the image processing section 314.

The base section CPU 311 controls the sections in the base section 301 described above and respective sections of the page memory section 302 described later.

The page memory section 302 comprises a system control section 304, a memory section (or page memory) 323, an address control section 306, an image bus 320, a control bus 321, a data control section 307, an image data I/F section 308, a resolution-conversion/binary-rotation section 325, a compression/expansion section 324, and a multi-value rotation memory 309. The system control section 304 controls communication of control data between the base section CPU 311 in the base section 301 and the expanded section CPU 361 in the expanded section 303, and also controls access to the page memory 323 from the base section 301 and the expanded section 303. The memory section (or page memory) 323 temporarily stores image data. The address control section 306 generates addresses for the page memory 323. The image bus 320 performs data transfer between respective devices in the page memory section 302. The control bus 321 performs transfer of control signals between the respective devices in the page memory and the system control section 304. The data control section 307 controls data transfer when performing data transfer between the page memory 323 and other devices through the image bus 320. The image data I/F section 308 serves as an interface for image data when transferring image data from and/or to the base section 301 through the base section image interface 317. The resolution-conversion/binary-rotation section 325 serves to convert image data into data of a different resolution when image data is transmitted to a device adopting a different resolution, convert image data received from a device adopting a different resolution into data adopting a resolution of a printer section 6 of the base section 301, or perform 90-degree-rotation processing on binary image data. The compression/expansion section 324 serves to compress image data to be transmitted, compress inputted image data for a device having a function of storing image data, or expand compressed image data so as to visualize the compressed data by the printer section 6. The multi-value rotation memory 309 is connected to the image data I/F section 308 and is used to rotate image data by 90 or −90 degrees when outputting the image data through the printer section.

The expanded section 303 comprises a control section (or expanded section CPU) 361, a main memory 361a, a ISA bus 374 for general purposes, an ISA bus controller (ISA.B/C) 363, a DMA controller (DMAC) 362, a memory section (HDD) 365, a HD.FD interface (HD.FDI/F) 364, a memory section (or optical disc device: ODD) 368, and a SCSI interface 367, a local area network channel control section (LAN) 371, a printer controller 370, a G4/G3.FAX control section 369, and an extended section image bus 375. The control section (or expanded section CPU) 361 controls respective devices described above in the expanded section 303 through an extended section system bus 373. The main memory 361a is used by the extended section CPU 361. The ISA bus controller (ISA.B/C) 363 serves as an interface between the extended section system bus 373 and the ISA bus 374. The DMA controller (DMAC) 362 controls data transfer on the ISA bus 374. The memory section (HDD) 365 is connected to the ISA bus 374 and electrically stores image data. The HD.FD interface (HD.FDI/F) 364 is an interface for the memory section 365. The memory section (ODD) 368 is connected to the ISA bus 374 and electrically store image data. The SCSI interface 367 is an interface for the memory section (ODD) 368. The local area network channel control section (LAN) 371 realizes a LAN function. The printer controller 370 realizes a printer function. The G4/G3.FAX control section 369 realizes G4/G3.FAX control section 369. The extended section image bus 375 outputs image data from the printer controller 370 to the page memory section 302 through the system image interface 377.

In a hard disc HD included in the HDD 365 described above, compressed image data items each representing a document set consisting of a page or pages are stored respectively as files, such that each document set is kept managed by retrieve data for retrieving the document set.

The expanded section system bus 373 is connected with an operation panel 80 comprising a keyboard and a display for supplying an instruction to the expanded section 303.

The memory section (ODD) 368 is connected to the ISA bus 374 through the SCSI interface 367, and the expanded section CPU 361 controls the memory section 368 with use of SCSI commands through the extended section system bus 373, ISA.B/C 63, and ISA bus 374.

Next, the image data I/F section (or image data control means) 308 will be explained below. The image data I/F section 308 is a device on the image bus 320 and performs image data transfer between the page memory 323 and the scanner section 4 or printer section 6. Also, the image data I/F section 308 performs image transfer between the page memory 323 and a printer controller 370 or the like connected to the extended image bus 375 in the expanded section 303.

The capacity of the page memory 323 in the page memory section 302 is much larger than the memory space used by the general purpose devices 364, . . .

Figure 3:
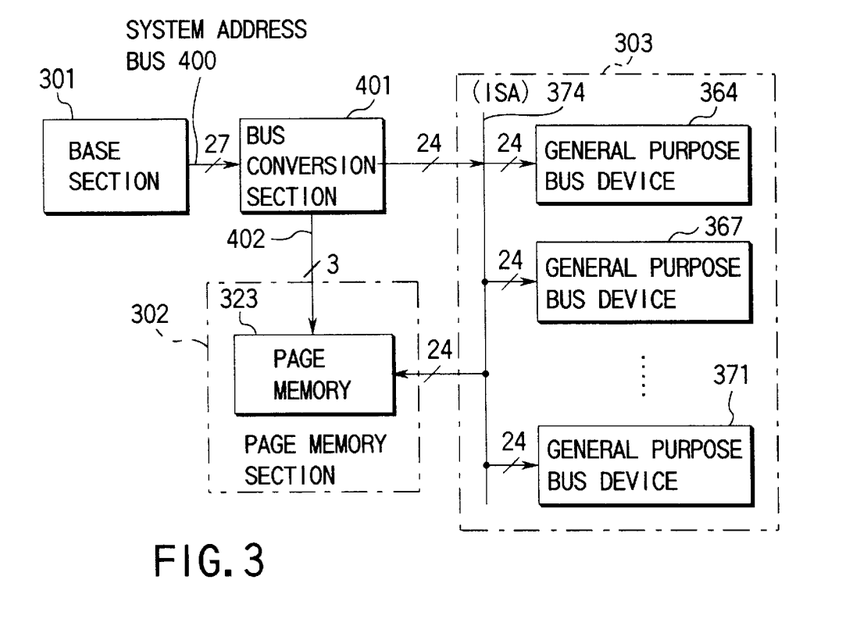
FIG. 3 is a view for schematically explaining a connecting state by the address bus of each system.

Next, connections of the three systems 301, 302, and 303 will be explained schematically below with reference to FIG. 3.

Specifically, a system address bus 400 of 27-bit in the base section system bus connected to the base section 301 is connected to a bus conversion section 401. The bus conversion section 401 connects 24 bits of the 27 bits of the system address bus 400 to the ISA bus 374, and also connects the other 3 bits of the system address bus 400 to an auxiliary bus 402 to the page memory section 302. The ISA bus 374 is connected to the bus conversion section 401 and to the HD.FD I/F 364, the SCSI interface 367, the G4/G3.FAX control section 369, the printer controller 370, the LAN 371, and the page memory 323, as general purpose devices.

Each of the general purpose bus devices 364, . . . uses a smaller memory space in comparison with a page memory 323 in the page memory section 302.

Figure 4:
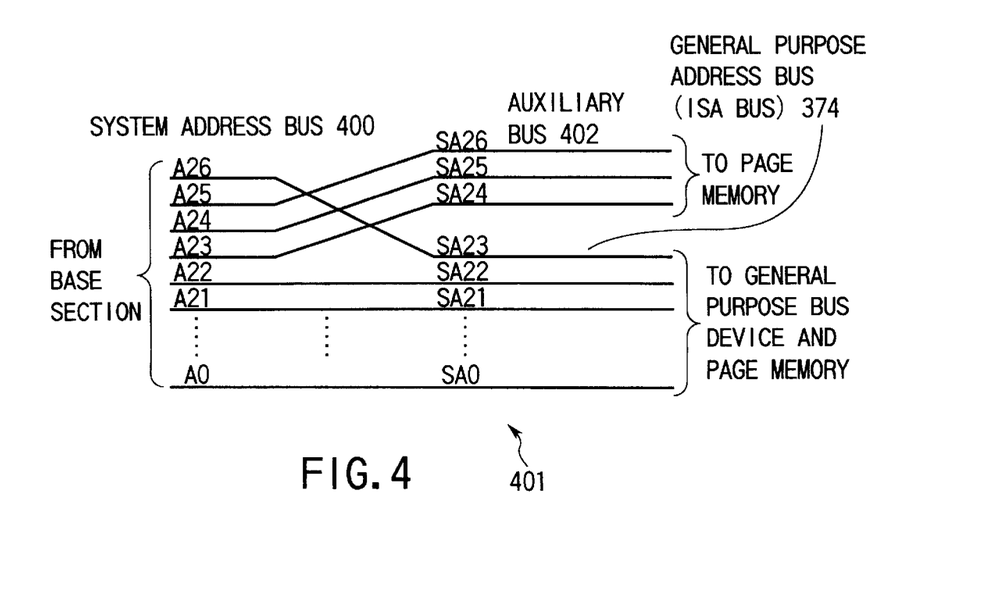
FIG. 4 is a view for explaining the structure of a bus conversion section.

The bus conversion section 401 connects the most significant bit (A26) of the system address bus 400 with the most significant bit (SA23) of the ISA bus 374, and also connects A0 to A22 of the system address bus 400 with SA0 to SA22 of the ISA bus 374, as well as A23 to A25 of the system address bus 400 to the auxiliary bus 402 (SA24, SA25, SA26). The most significant bit (SA23) of the ISA bus 374, i.e., the most significant bit (A26) of the system address bus 400 is use for a signal for switching the general purpose bus devices and the page memory section 302.

To simplify explanation, it is supposed below that the ISA bus 374 has a memory space of 16M bytes, that the general purpose bus devices 364, . . . has a memory space of total 8M bytes or less, and that the page memory 323 of the page memory section has a memory space of 64M bytes.

Specifically, each of the general purpose devices, . . . uses total 24 signal lines from SA0 to SA23 of the ISA bus 374, converted by the bus conversion section 401. Since the general purpose bus devices use only a memory space of total 8M bytes or less, the signal lines which are actually used as addresses are 23 signal lines SA0 to SA22 and the signal line SA23 is not required. Therefore, the signal line SA23 is connected to the general purpose devices and a chip enable of the page memory 323. For example, when the signal line SA23 is at a level L, access to respective bus devices is enabled. When the signal line SA23 is at a level H, access to the page memory 323 is enabled.

The page memory 323 has a memory space of 64M bytes and therefore requires 26 address lines. Specifically, the address lines to the page memory 323 are constituted by 23 lines of SA0 to SA22 of the ISA bus 374, and 3 lines of SA24 to SA26 of the auxiliary bus 402 used only by the page memory 323, while the line SA23 of the ISA bus 374 constitutes a chip enable (CE) signal line to the page memory 323.

Figure 5:
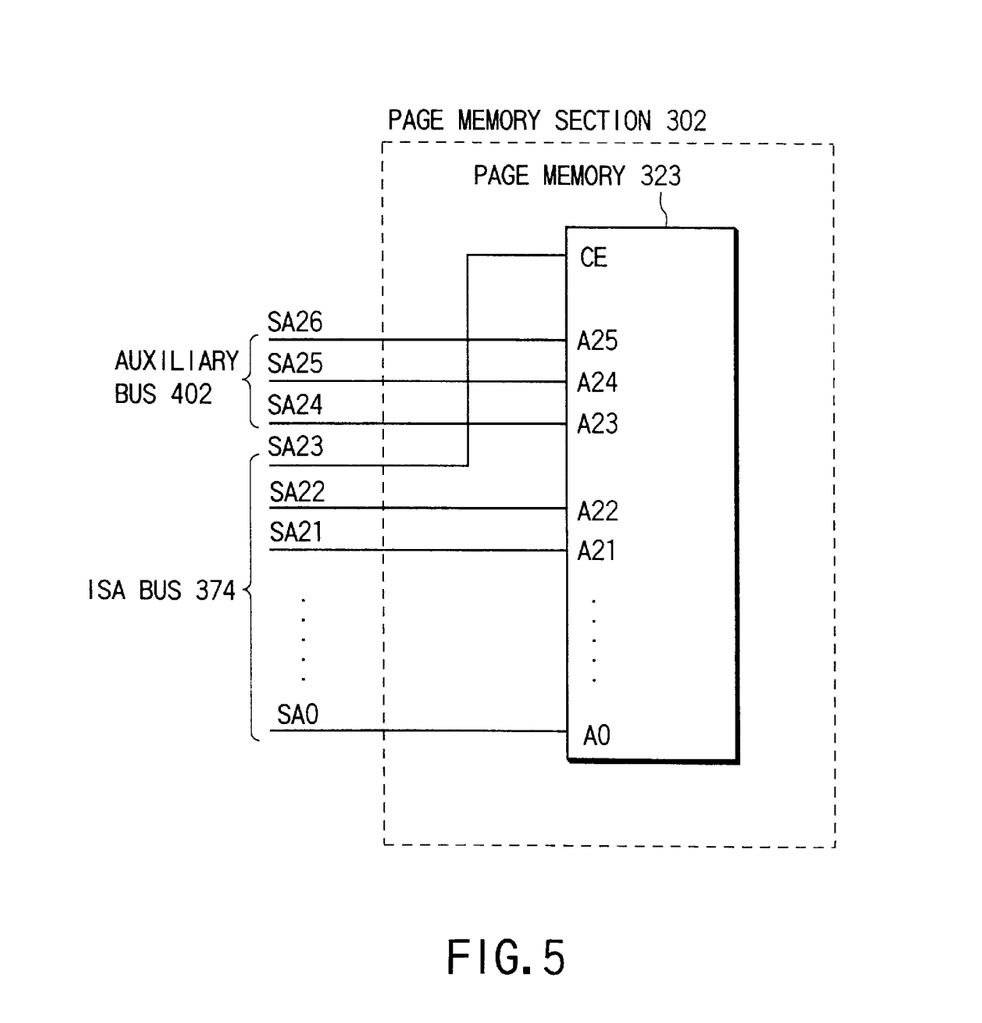
FIG. 5 is a view for showing an example of structure of a main part of a page memory.

FIG. 5 shows an example of wiring of the page memory 323. The most significant bit SA23 of the ISA bus 374 is connected to an enable terminal CE of the page memory 323, so that access to the page memory 323 can be made during a level H. In addition, SA0 to SA22 of the iSA bus 374 are respectively connected to address A0 to A22 of the page memory 323, and SA24 to SA26 of the auxiliary bus 402 are respectively connected to the address A23 to A25 of the auxiliary bus 402.

By using the structure as described above, respective devices (e.g., general purpose bus devices 364, . . . , page memory 323) can be arranged on a memory space of 128M bytes, viewed from the base section 301, although a general purpose bus having a small memory space (e.g., an ISA bus 374) is used.

Figure 6:
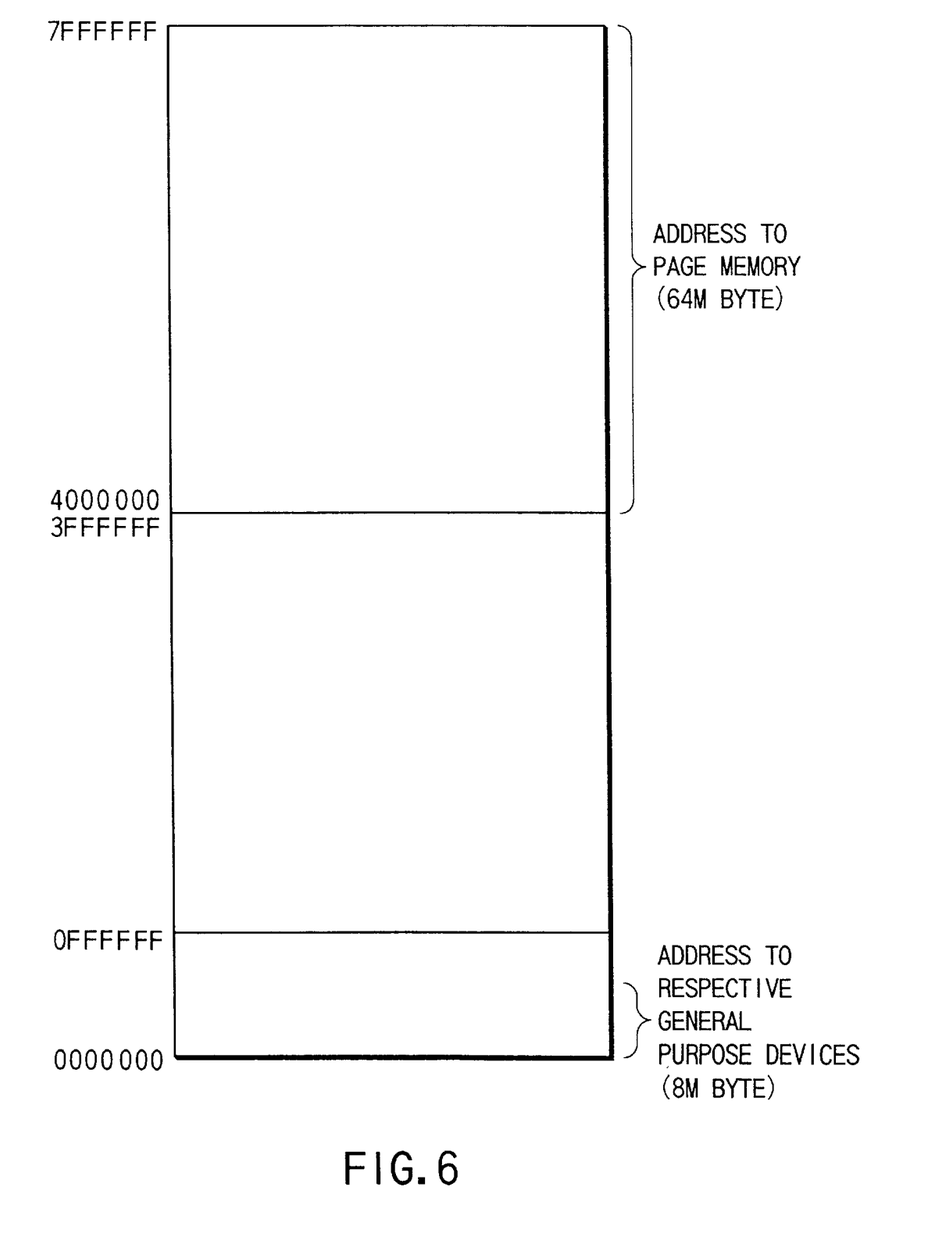
FIG. 6 is a view for explaining addresses to a page memory and general purpose bus devices by a base section.
Figure 7:
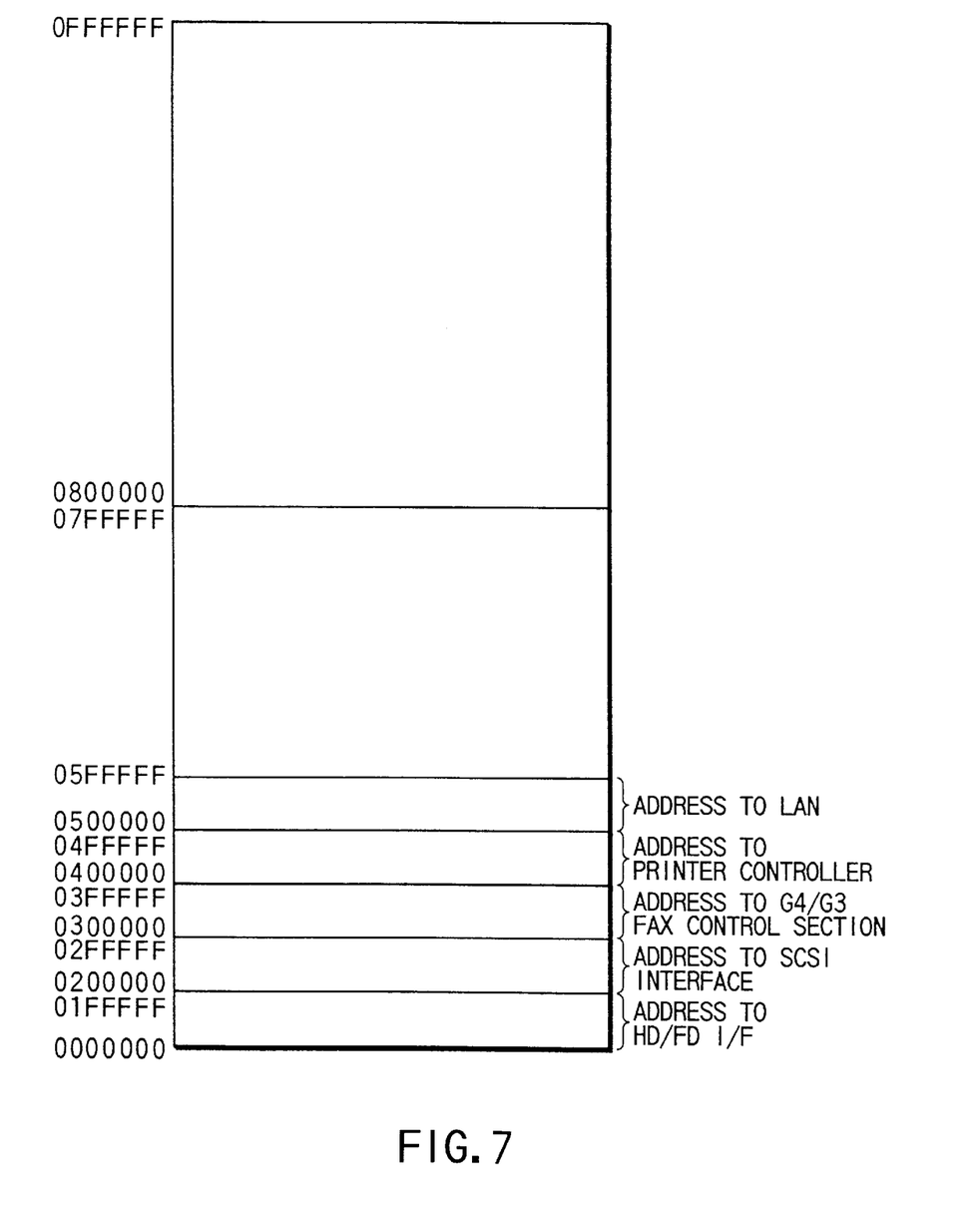
FIG. 7 is a view for specifically showing addresses to general purpose devices by a base section.

Specifically, as shown in FIG. 6, the general purpose bus devices 364, . . . , use first 8M bytes ("0000000" to "07FFFFF") of a memory space of 128M bytes ("110000000" to "7FFFFFF"), and the page memory 323 uses 64M bytes ("4000000" to "7FFFFFF") of the last half of the memory space of the 128M bytes. Note that FIG. 7 specifically illustrates the first address "10000000" to an address "0FFFFFF" in the memory space shown in FIG. 6.

By thus connecting the address A26 (i.e., the most significant bit of the ISA bus 374) of the system address bus 400, only the page memory can be rendered accessible when the address line A26 is at a level H, while only the general purpose devices can be rendered accessible when the address line A26 is at a level L. Note that address lines of the system address bus which are directly connected to the ISA bus 374 are lower 23 bits (A0 to A22), as is apparent from FIG. 4. Since the ISA bus according to the present embodiment consists of 24 bits in which the most significant bit is used as an enable bit, the memory space corresponding to the lower 23 bits from the system address bus is ½ of the all memory space which the ISA bus 374 can use.

If addresses "A0 to A23" of the system address bus are directly used as SA0 to SA23 of the ISA bus and addresses "A0 to A25 and A26" of the system address bus are directly used as addresses "A0 to A25" of the page memory 323 and the chip enable CE, addresses "000000" to "FFFFFF" are accessed at the same time when the base section 301 makes access to the page memory addresses "4000000" to "4FFFFFF". In a conventional technique, an additional component such as an address decoder or the like would be provided between a system address bus 400 and an ISA bus 374 so that ISA bus addresses "4000000" to "4FFFFFF" might not be accessed when a base section 301 accesses page memory addresses "4000000" to "4FFFFFF". In the present invention, it is needless to provide such an additional component.

As has been described above, according to the present invention, a device such as a page memory or the like which uses a large memory space can be connected to the system address bus together with a general purpose bus using a small memory space, without use of an address decoder or the like, thus general purpose bus device can be used at a low price.

Therefore, in a copying machine comprising a general purpose bus (or an ISA bus) for an expanded option, it is possible to make access to an optional page memory having a memory space (e.g., 16M bytes in case of the present embodiment) which is as large as or larger than a memory space of a general purpose bus.

Thus, by arranging a page memory having a memory space of 64M bytes such that the page memory can be connected to the ISA bus having a memory space of 16M bytes, a general purpose bus device such as a device 364 and the like can be used so that the system can be manufactured at a low cost.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An image transfer system comprising:

a first device for generating address data;

a second device having a first memory space for performing processing in accordance with address data from the first device;

a third device having a second memory space larger than the first memory space for performing processing in accordance with address data from the first device;

a first address bus of a plurality of bits for transferring address data outputted from the first device;

a second address bus for transferring address data with use of bits less than the plurality of bits of the first address bus; and a bus conversion section for connecting a most significant bit of the first address bus with a most significant bit of the second address bus, for connecting predetermined lower bits of the first address bus with other bits of the second address bus than the most significant bit thereof, and for connecting bits of the first address bus which are not connected with the second address bus, with the third device, wherein the predetermined lower bits of address data outputted from the first device to the third device are supplied to the third device through the first address bus, the bus conversion section, and the second address bus, other bits of the address data other than the predetermined lower bits are supplied to the third device through the first address bus and the bus conversion section, and address data outputted from the first device to the second device is supplied to the second device through the first address bus, the bus conversion section, and the second address bus.

2. A system according to claim 1, wherein a memory space corresponding to predetermined lower bits of the first address bus is ½ of a memory space used by the second device.

3. A system according to claim 1, wherein the second device is a general purpose device, and the third device is a page memory.

4. A system according to one claim 1, wherein the second address bus is an ISA bus.

5. An image transfer system comprising:

a system section for generating address data;

a general purpose bus device having a first memory space, for performing processing in accordance with address data from the system section;

a page memory having a memory space larger than the first memory space, for performing processing in accordance with address data from the system section;

a system address bus for transferring address data outputted from the system section;

a general purpose address bus for transferring address data by bits less than the system address bus; and a bus conversion section for connecting a most significant bit of the system address bus with a most significant bit of the general purpose address bus, for connecting predetermined lower bits of the system address bus with other bits of the general purpose address bus than the most significant bit thereof, and for connecting bits of the system address bus which are not connected with the general purpose address bus, with the page memory, wherein the predetermined lower bits of address data outputted from the system section to the page memory are supplied to the page memory through the system address bus, the bus conversion section, and the general purpose address bus, other bits of the address data other than the predetermined lower bits are supplied to the page memory through the system address bus and the bus conversion section, and address data outputted from the system section to the general purpose bus device is supplied to the general purpose bus device through the system address bus, the bus conversion section, and the general purpose address bus.

6. A system according to claim 5, wherein a memory space corresponding to predetermined lower bits of the system address bus is ½ of a memory space used by the general purpose bus device.

7. A system according to one of claim 6, wherein the general purpose address bus is an ISA bus.

8. A system according to one of claim 7, wherein the general purpose address bus is an ISA bus of 24 bits, and the predetermined lower bits of the system address bus are of 23 bits.

9. An image-forming apparatus comprising:

a system section for generating address data;

a general purpose bus device having a first memory space, for performing processing in accordance with address data from the system section;

a page memory having a memory space larger than the firs memory space, for performing processing in accordance with address data from the system section;

image forming means for forming an image with use of the system section, the general purpose bus device, and the page memory; and an image transfer system including a system address bus for transferring address data outputted from the system section, a general purpose address bus for transferring address data, and a bus conversion section for connecting a most significant bit of the system address bus with a most significant bit of the general purpose address bus, for connecting predetermined lower bits of the system address bus with other bits of the general purpose address bus than the most significant bit thereof, and for connecting bits of the system address bus which are not connected with the general purpose address bus, with the page memory, wherein the predetermined lower bits of address data outputted from the system section to the page memory are supplied to the page memory through the system address bus, the bus conversion section, and the general purpose address bus, other bits of the address data other than the predetermined lower bits are supplied to the page memory through the system address bus and the bus conversion section, and address data outputted from the system section to the general purpose bus device is supplied to the general purpose bus device through the system address bus, the bus conversion section, and the general purpose address bus.

10. An apparatus according to claim 9, wherein a memory space corresponding to predetermined lower bits of the system address bus is ½ of a memory space used by the general purpose bus device.

11. An apparatus according to claim 10, wherein the general purpose address bus is an ISA bus.

12. A system according to claim 7, wherein the general purpose address bus is an ISA bus of 24 bits, and the predetermined lower bits of the system address bus are of 23 bits.

13. A system according to claim 2, wherein the second device is a general purpose device, and the third device is a page memory.

14. A system according to claim 2, wherein the second address bus is an ISA bus.

15. A system according to claim 3, wherein the second address bus is an ISA bus.

* * * * *